(12) United States Patent
Hong et al.

(10) Patent No.: US 11,869,382 B2
(45) Date of Patent: Jan. 9, 2024

(54) METHOD OF SUPPORTING SELF-LEARNING AND SYSTEM FOR PERFORMING THE SAME

(71) Applicant: ELECTRONICS AND TELECOMMUNICATIONS RESEARCH INSTITUTE, Daejeon (KR)

(72) Inventors: Sungjin Hong, Daejeon (KR); Hee Sook Shin, Daejeon (KR); Youn-Hee Gil, Daejeon (KR); Seong Min Baek, Daejeon (KR); Cho-rong Yu, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/727,557

(22) Filed: Apr. 22, 2022

(65) Prior Publication Data

US 2023/0127732 A1    Apr. 27, 2023

(30) Foreign Application Priority Data

Oct. 21, 2021  (KR) .................. 10-2021-0140898

(51) Int. Cl.
*G06F 3/01* (2006.01)
*G09B 5/02* (2006.01)
*G06T 7/70* (2017.01)
*G06F 3/12* (2006.01)

(52) U.S. Cl.
CPC ................ *G09B 5/02* (2013.01); *G06F 3/12* (2013.01); *G06T 7/70* (2017.01)

(58) Field of Classification Search
CPC .. G09B 5/02; G06T 7/70; G06T 19/20; G06F 3/12
USPC ........................................... 463/31
See application file for complete search history.

(56) References Cited

U.S. PATENT DOCUMENTS

| | | | |
|---|---|---|---|
| 2010/0159430 A1 | 6/2010 | Lee | |
| 2017/0213545 A1 | 7/2017 | Kwon | |
| 2023/0083302 A1* | 3/2023 | Benedetto | G06T 19/20 463/31 |

FOREIGN PATENT DOCUMENTS

| | | | |
|---|---|---|---|
| KR | 10-1776254 B1 | 9/2017 | |
| KR | 10-2023024 B1 | 11/2019 | |
| KR | 10-2020-0086872 A | 7/2020 | |
| KR | 10-2179983 B1 | 11/2020 | |

(Continued)

*Primary Examiner* — Abdul-Samad A Adediran

(57) ABSTRACT

A method of supporting self-learning and a system for performing the method are disclosed. The method includes estimating an object of interest of a user in content based on user performance information inputted by the user in response to content situation information and the content being received from a learning module including the content, analyzing the content situation information, determining whether to generate support information for supporting the user to perform the content based on the estimated object of interest and the analyzed content situation information, and generating the support information that allows the user to self-learn the content according to whether to generate the support information, and outputting the support information to the learning module.

16 Claims, 6 Drawing Sheets

(56) References Cited

FOREIGN PATENT DOCUMENTS

| | | | |
|---|---|---|---|
| KR | 10-2266479 | B1 | 6/2021 |
| KR | 10-2280720 | B1 | 7/2021 |

\* cited by examiner

METHOD OF SUPPORTING SELF-LEARNING AND SYSTEM FOR PERFORMING THE SAME

CROSS-REFERENCE TO RELATED APPLICATION

This application claims the benefit of Korean Patent Application No. 10-2021-0140898 filed on Oct. 21, 2021, in the Korean Intellectual Property Office, the entire disclosure of which is incorporated herein by reference for all purposes.

BACKGROUND

1. Field of the Invention

One or more example embodiments relate to a method of supporting self-learning and a system for performing the method.

2. Description of the Related Art

As non-face-to-face technologies draw attentions, content that performs experience or training programs using virtual reality is diversifying. Information about the user's status in the content may be collected and feedback may be provided to the user in order for the user to smoothly perform experience or training program in the content.

The above described is possessed or acquired by the inventor in the process of deriving the present disclosure, and not necessarily said to be a known technology disclosed to the general public prior to the present disclosure.

SUMMARY

A head-mounted display (HMD) with an eye tracking function may be used to collect information about a user's status within the content. A method of using the eye tracking function of the HMD requires calibration and high cost for each user, which makes it difficult to use in the content. Accordingly, a technique of collecting the user's status information in the content without using the eye tracking function of the HMD may be required. In addition, a technique of supporting the user's self-learning by generating feedback based on the collected user's status information may be required.

Various example embodiments may provide a technology which collects the user's status information by calculating collision coordinates between objects in the content without using the HMD's eye tracking function in the self-learning content and supports customized feedback to the user according to the user's cognitive status determined from the collected information.

However, the technical aspects are not limited to the aforementioned aspects, and other technical aspects may be present.

According to an aspect, there is provided a method of supporting self-learning which includes estimating an object of interest of a user in content based on user performance information inputted by the user in response to content situation information and the content being received from a learning module including the content, analyzing the content situation information, determining whether to generate support information for supporting the user to perform the content based on the estimated object of interest and the analyzed content situation information, and generating the support information that allows the user to self-learn the content according to whether to generate the support information, and outputting the support information to the learning module.

The method may further include generating an evaluation for the support information based on a response of the user according to the support information and updating the support information based on the evaluation, and storing the evaluation and the updated support information in a database.

The user performance information may be received by the learning module from a head-mounted display (HMD) that does not have an eye tracking function and a controller.

The estimating operation may include selecting, as a collision plane, one of a plurality of finite planes forming one or more objects included in the content from position information and rotation information of the HMD and the controller, and position information, rotation information and size information of the one or more objects, generating a plurality of feature vectors based on center coordinates of the collision plane, a plurality of collision coordinates, positions of the HMD and the controller and center coordinates of the object, generating an estimation model based on the plurality of feature vectors, and estimating the object of interest using the estimation model.

The selecting may include extracting front vectors of the HMD and the controller, obtaining a plurality of collision coordinates on a plurality of infinite planes by calculating coordinates at which the front vectors collide on the plurality of infinite planes, the plurality of infinite planes extending from a plurality of finite planes forming an object included in the content, and selecting, as a collision plane, a finite plane having a minimum distance from the plurality of collision coordinates from among the plurality of finite planes.

The analyzing may include dividing one of one or more performance stages included in the content into a plurality of sub-stages, and defining a main object among the one or more objects for each of the plurality of sub-stages and defining an action to be performed by the user using the main object.

The determining of whether to generate the support information may include determining whether to generate the support information based on feature data for a first time spent in the performance stage for which the user requests help and feature data for a second time spent in the performance stage for which the user does not request help.

The support information may include position clue information to find the main object and motion information about an action required for the user to perform the content.

According to various example embodiments, there is provided a device including a memory including instructions, and a processor electrically connected to the memory and configured to execute the instructions, wherein, when the instructions are executed by the processor, the processor may be configured to estimate an object of interest of a user in content based on user performance information inputted by the user in response to content situation information and the content being received from a learning module including the content, analyze the content situation information, determine whether to generate support information for supporting the user to perform the content based on the estimated object of interest and the analyzed content situation information, and generate the support information that allows the user to self-learn the content according to whether to generate the support information, and output the support information to the learning module.

The processor may be configured to generate an evaluation of the support information based on a response of the user according to the support information and update the support information based on the evaluation, and store the evaluation and the updated support information in a database.

The user performance information may be received by the learning module from an HMD that does not have an eye tracking function and a controller.

The processor may be configured to select, as a collision plane, one of a plurality of finite planes forming one or more objects included in the content from position information and rotation information of the HMD and the controller, and position information, rotation information and size information of the one or more objects, generate a plurality of feature vectors based on center coordinates of the collision plane, a plurality of collision coordinates, positions of the HMD and the controller and center coordinates of the object, generate an estimation model based on the plurality of feature vectors, and estimate the object of interest using the estimation model.

The processor may be configured to extract front vectors of the HMD and the controller, obtain a plurality of collision coordinates on a plurality of infinite planes by calculating coordinates at which the front vectors collide on the plurality of infinite planes, the plurality of infinite planes extending from a plurality of finite planes forming an object included in the content, and select, as a collision plane, a finite plane having a minimum distance from the plurality of collision coordinates from among the plurality of finite planes.

The processor may be configured to divide one of one or more performance stages included in the content into a plurality of sub-stages, and define a main object among the one or more objects for each of the plurality of sub-stages and define an action to be performed by the user using the main object.

The processor may be configured to determine whether to generate the support information based on feature data for a first time spent in the performance stage for which the user requests help and feature data for a second time spent in the performance stage for which the user does not request help.

The support information may include position clue information to find the main object and motion information about an action required for the user to perform the content.

Additional aspects of example embodiments will be set forth in part in the description which follows and, in part, will be apparent from the description, or may be learned by practice of the disclosure.

BRIEF DESCRIPTION OF DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
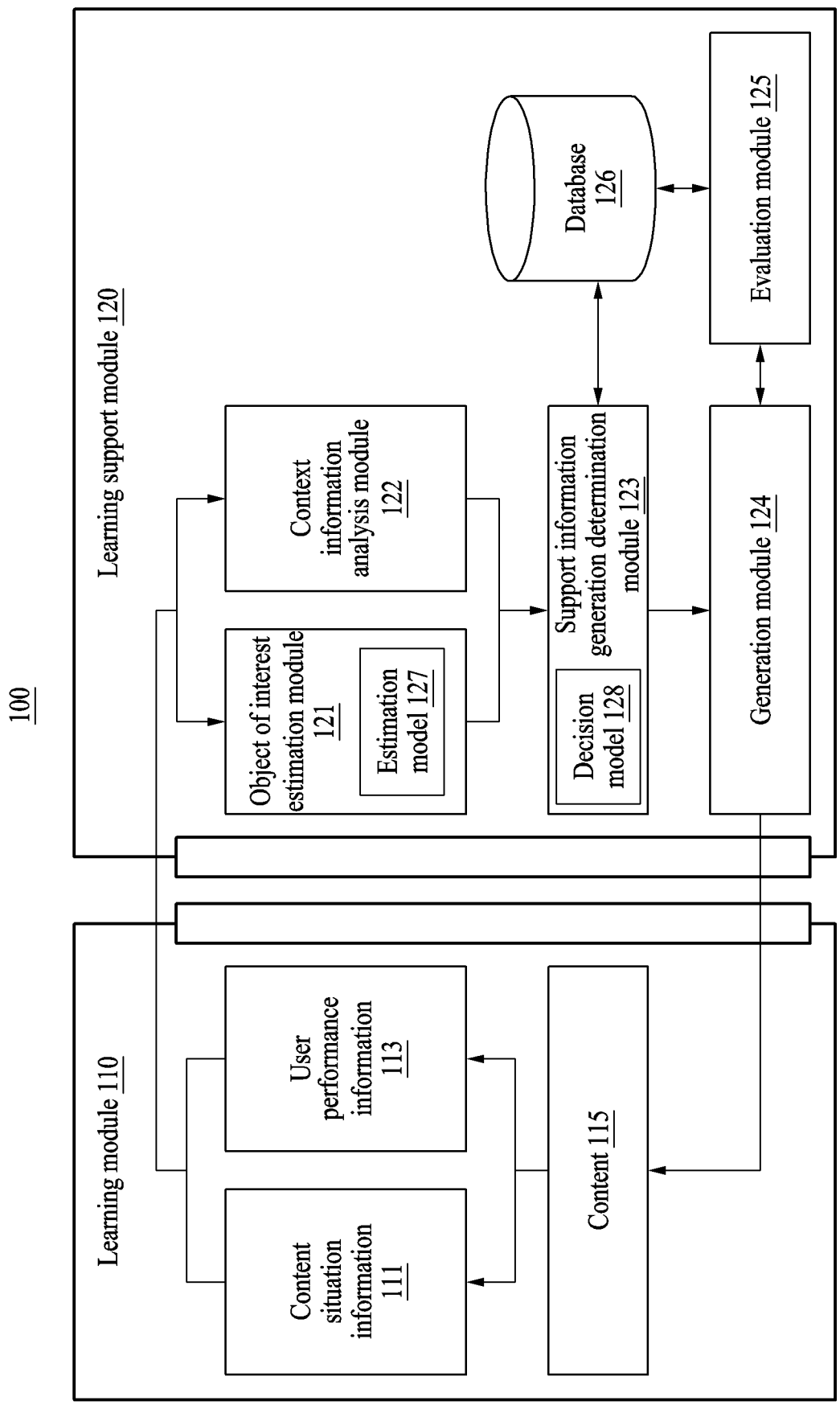
FIG. 1 is a block diagram illustrating an electronic device according to various example embodiments.

Specific structural or functional descriptions of example embodiments are disclosed only for the purposes of illustration, and may be changed and implemented in various forms. Accordingly, the actual implementation is not limited to specific example embodiments disclosed, and the scope of the present disclosure includes changes, equivalents or substitutes included in the technical ideas described in the example embodiments.

Although terms such as first or second may be used to describe various elements, these terms should be interpreted only for the purpose of distinguishing one element from another. For example, a first component may be named as a second component, and similarly, a second component may also be named as a first component.

When a component is referred to as being "coupled to" another component, it may be directly coupled or connected to the other component, but it should be understood that another component may exist in between.

A singular expression includes a plural expression unless the context clearly indicates otherwise. In the present disclosure, it should be understood that terms such as "comprise", "include", or "have" are intended to designate that a feature, number, step, operation, component, part, or a combination thereof described in the specification exists, but do not preclude the possibility of existence or addition of one or more other features, numbers, steps, operations, components, parts, or combinations thereof.

Unless otherwise defined, all terms used herein, including technical or scientific terms, have the same meaning as commonly understood by a person skilled in the art to which the example embodiment pertains. Terms such as those defined in dictionaries commonly used should be construed as having meanings consistent with the meanings in the context of the related art, and are not construed in ideal or excessively formal meanings unless explicitly defined in the present disclosure.

Hereinafter, example embodiments will be described in detail with reference to the accompanying drawings. In the description with reference to the accompanying drawings, the same elements are given the same reference numerals regardless of numerals in the drawing, and overlapping descriptions thereof may be omitted.

FIG. 1 is a block diagram illustrating an electronic device according to various example embodiments.

Referring to FIG. 1, an electronic device 100 may include a learning module 110 and a learning support module 120 according to various example embodiments. The learning module 110 may include content 115, content situation information 111 obtained from the content, and user performance information 113 input by the user in response to the content 115. The content 115 may include a situation for the user to learn and/or train in a virtual environment, and the user may receive visual and audio information of the virtual environment in an enclosed environment using a head-mounted display (HMD) and perform an action corresponding to an action of utilizing a hand in a virtual environment using the controller. Information of the HMD and the controller may be tracked in real time, and may include three-dimensional position information and rotation information.

According to various example embodiments, the learning module 110 may output the content situation information 111 and the user performance information 113 to a learning support module 120. The content situation information 111 may include all learning stages to be performed included in the content 115, information about a stage currently being performed by the user, performance time and information about properties of one or more objects included in the content 115 (for example position information, size information, rotation information, shape information, etc.). The user performance information 113 may include an HMD worn by the user while performing the content 115 and real-time position information and rotation information of the controller, and information input to the controller (for example, whether a controller button is clicked, etc.) may be included. The learning module 110 may receive support information customized for the user based on the content situation information 111 and the user performance information 113 by the learning support module 120 and reflect the support information in the content 115. The user may utilize the support information within the content and perform self-learning smoothly.

According to various example embodiments, the learning support module 120 may generate customized support information to help the user's self-learning based on the content situation information 111 and the user performance information 113 and output the customized support information to the learning module 110. The learning support module 120 may include an object of interest estimation module 121, a situation information analysis module 122, a support information generation determination module 123, a generation module 124, an evaluation module 125 and a database 126.

According to various example embodiments, the object of interest estimation module 121 may estimate the user's object of interest using an estimation model 127 generated based on the content situation information 111 interested by the user and the user performance information 113 even though the user is unable to physically contact the object due to the nature of the virtual environment within the content. The estimation model 127 may be generated by an operation described later with reference to FIG. 2.

According to various example embodiments, the object of interest estimation module 121 may output (for example estimate) the object of interest of the user in real time by inputting a feature vector generated in real time to the estimation model 127. The feature vector may be generated in real time according to the positions of the HMD and the controller by an operation described later with reference to FIG. 4.

According to various example embodiments, the situation information analysis module 122 may analyze the content situation information 111 received from the learning module 110. The situation information analysis module 122 may divide any one of one or more performance stages included in the content 115 into a plurality of sub-stages, define a main object directly related to the learning of content 115 among one or more objects included in the content 115 at each of the plurality of sub-stages and define an action to be performed by the user using the main object. The situation information analysis module 122 may classify one or more objects according to characteristics and manage information obtained from one or more objects. For example, in the case that the content 115 is about 'espresso extraction training' for barista job training, 'wiping the portafilter with a dry cloth', which is one of one or more performance stages, may be distinguished by three stages of a first sub-stage (for example 'grabbing the portafilter'), a second sub-stage (for example 'grabbing a dry cloth'), and a third sub-stage (for example 'grab two objects and create friction'). A main object of the first sub-stage may be a portafilter and an action to be performed by the user may be a grabbing action, a main object of the second sub-stage may be a dry cloth and an action to be performed by the user may be a grabbing action, and main objects of the third sub-stage may be a portafilter and a dry cloth and an action to be performed by the user may be an action that causes friction by grabbing and colliding. The situation information analysis module 122 may classify one or more objects included in the content 115 into one or more sets based on whether or not they are used (for example a set of barista objects that are directly used in one or more performance stages, and a set of background objects that are not used), and the set of objects that are directly used in one or more performance stages (for example, barista objects) may be classified into one or more sets based on whether or not they are used in the current stage.

According to various example embodiments, the support information generation determination module 123 may request the user to perform a performance stage in the content 115 (for example, espresso extraction training, terminology training, etc.). The performance stage may be additionally inserted into the content 115 to determine a cognitive status of the user. The support information generation determination module 123 may receive first feature data about the user's object of interest from the object of interest estimation module 121 while the user performs the content 115, and receive second feature data about one or more objects from the situation information analysis module 122. The first feature data may include information (for example, a rate, a number, time, transition, etc. that the user looks at for a specific time period) obtained (for example, measured) from one or more objects included in the content 115, and the second feature data may include information (for example, a rate, a number, time transition, etc. that the user looks at) for each set obtained (for example, measured) from one or more objects classified into sets according to whether or not they are used.

According to various example embodiments, the support information generation determination module 123 may determine whether to generate support information for facilitating user's self-learning using the decision model 128 generated based on the first and the second feature data. The decision model 128 may be generated by an operation described later in FIG. 4.

According to various example embodiments, the support information generation determination module 123 may output (for example, determine) in real time whether to generate support information in the content 115 by inputting the first and the second feature data received in real time to the decision model 128.

According to various example embodiments, in the case that the support information is generated according to the support information generation determination module 123, the generation module 124 may generate support information by an operation described later with reference to FIG. 5, and output the support information into a learning module 110 and the evaluation module 125. After the learning module 110 reflects the support information in the content 115, the evaluation module 125 may generate an evaluation of the support information based on a user's response according to the support information. For example, the evaluation module 125 may determine (for example, evaluate) whether the user performs one or more performance stages of the content 115 according to a target intended by the learning support module 120 for a certain period of time from the point when the support information is reflected in the content 115. If the user does not perform as intended, the evaluation module 125 may evaluate that the generated support information is not appropriate, update the method of generating support information by changing the expression format (for example, color, shape, type, etc.), and output the updated method to the generation module 124. The generation module 124 may update the support information according to the updated method and output the updated support information to the learning module 110, so that the learning module 110 may newly reflect the support information in the content 115. The evaluation module 125 may output and store the evaluation of the support information, the updated method and the updated support information in the database 126, so that those may be utilized for content creation.

Figure 2:
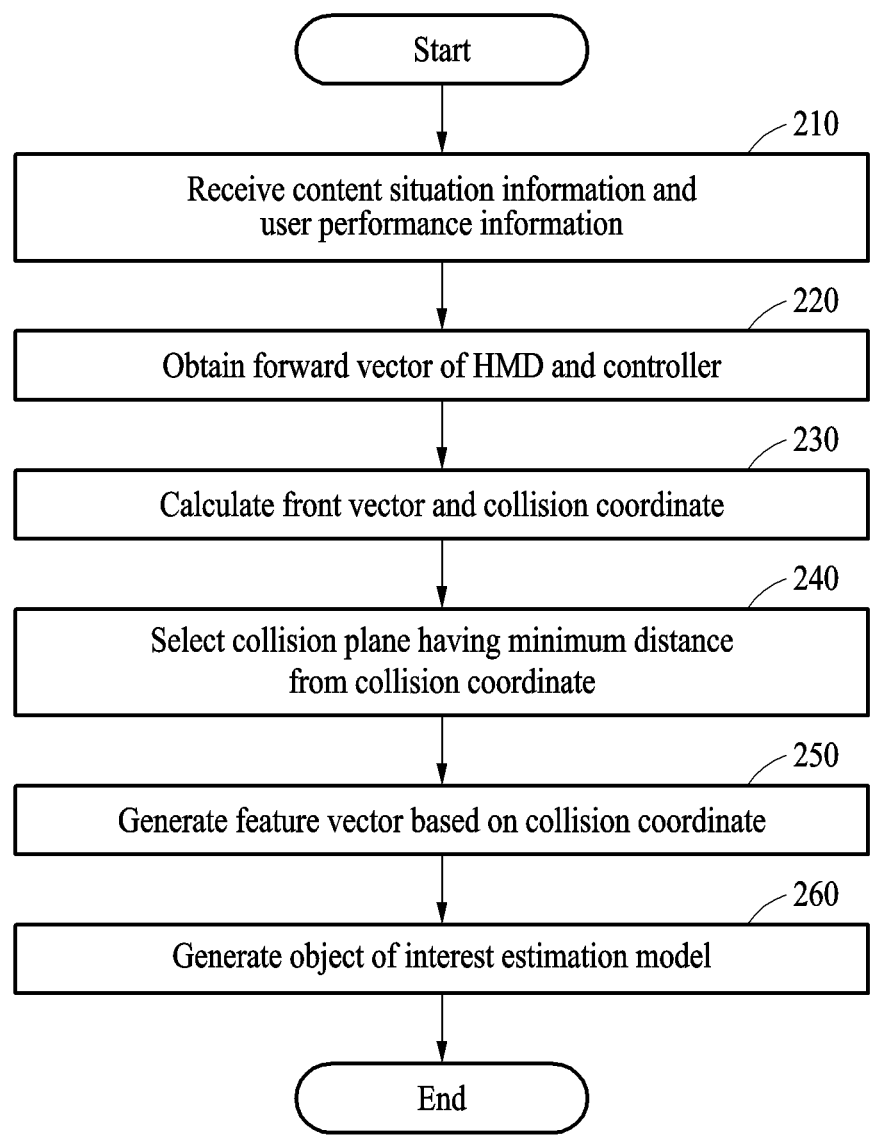
FIG. 2 is a flowchart illustrating an operation of generating an estimation model according to various example embodiments.

FIG. 2 is a flowchart illustrating an operation of generating an estimation model according to various example embodiments.

Operations 210 to 260 may be an operation of the object of interest estimating module 121 generating the estimation model 127 which estimates the user's object of interest among one or more objects included in the content.

In operation 210, an object of interest estimation module (for example, the object of interest estimation module 121 of FIG. 1) may receive content situation information (for example, the content situation information 111 of FIG. 1) and user performance information (for example, the user performance information 113 of FIG. 1) from a learning module (for example, the learning module 110 of FIG. 1).

In operation 220, the object of interest estimation module 121 may obtain forward vectors of an HMD and a controller from position information and rotation information of the HMD and the controller. The forward vectors may be axes of a local coordinate of the HMD and the controller, or axes generated by converting local coordinates of the HMD and the controller into coordinates defined by the user through a rotation matrix.

In operation 230, the object of interest estimation module 121 may calculate a front vector and a collision coordinate of any one of one or more objects included in the content 115 based on position information, rotation information and size information of one or more objects included in the content (for example, the content 115 of FIG. 1). The object of interest estimation module 121 may obtain a plurality of collision coordinates in a plurality of infinite planes by calculating coordinates at which the front vector collides in a plurality of infinite planes extending from a plurality of finite planes which form any one of one or more objects included in the content 115.

In operation 240, the object of interest estimation module 121 may select a finite plane having a minimum distance from the plurality of collision coordinates among the plurality of finite planes as a collision plane.

In operation 250, the object of interest estimation module 121 may calculate distance information, angle information and projected distance information between the coordinates based on center coordinates of the collision plane, the plurality of collision coordinates, position coordinates of the HMD and the controller and center coordinates of the object. The object of interest estimation module 121 may generate a plurality of feature vectors based on the calculated information. The plurality of feature vectors may be collected for a time greater than or equal to one frame.

In operation 260, the object of interest estimation module 121 may generate the estimation model 127 based on the plurality of feature vectors and the calculated information.

Figure 3:
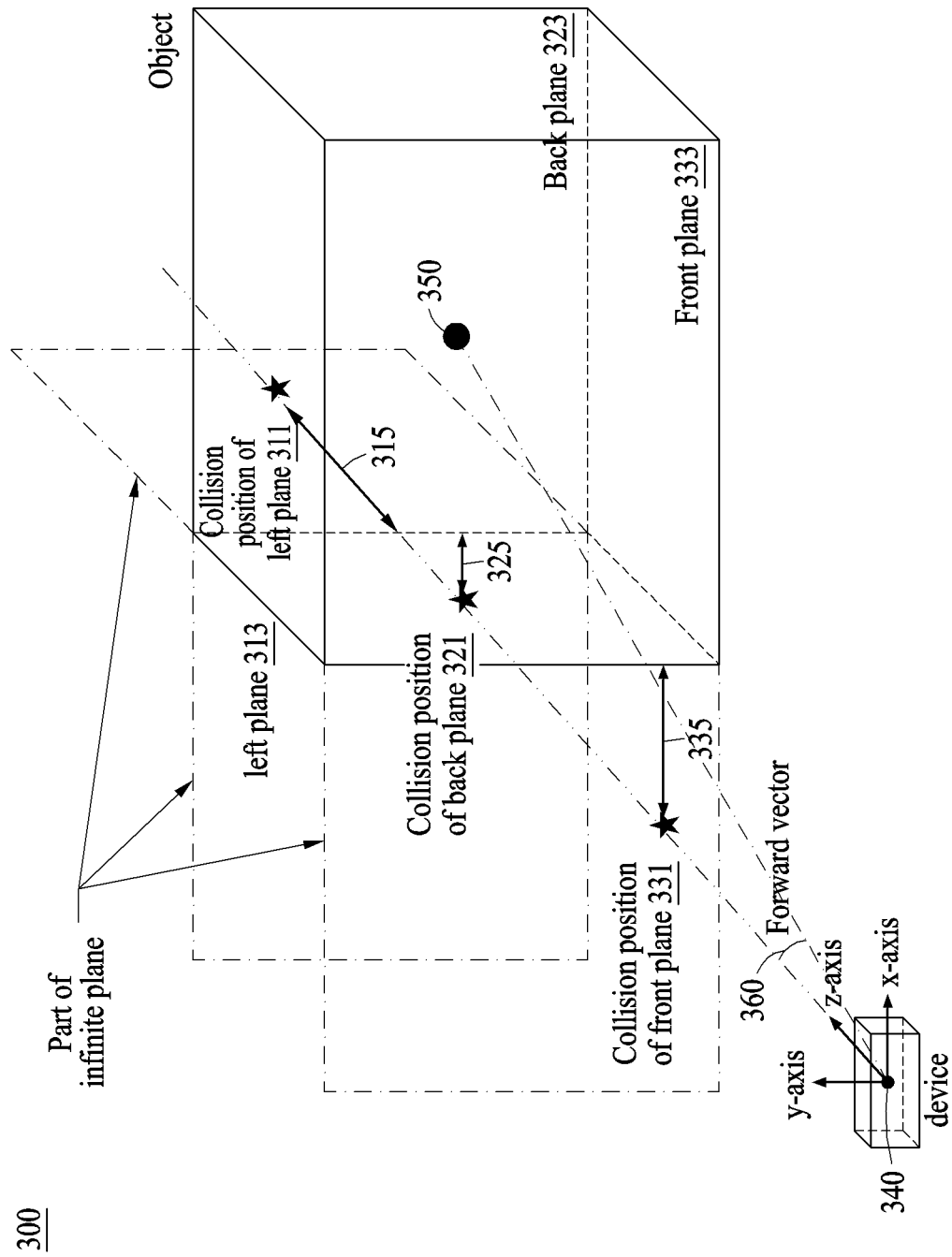
FIG. 3 is a diagram illustrating an operation of obtaining a feature vector according to various example embodiments.

FIG. 3 is a diagram for illustrating an example of an operation of obtaining a feature vector according to various example embodiments.

Referring to FIG. 3, according to various example embodiments, an object of interest estimation module (for example, the object of interest estimation module 121 of FIG. 1) may calculate collision coordinates with front vectors of the HMD and the controller if any one of one or more objects included in content (for example, the content 115 of FIG. 1) has a cuboid shape. In FIG. 3, the collision coordinates are calculated for three surfaces with respect to an object having a cuboid shape for convenience of explanation but not necessarily limited thereto, and may be calculated for one or more surfaces and/or for any surfaces of the object (for example, up to 6 surfaces of an object with the shape of a cuboid).

According to various example embodiments, the object of interest estimation module 121 may obtain forward vectors of the HMD and the controller from position information and rotation information of the HMD and the controller. For example, the front vectors may be z-axes that are one axis of the local coordinates of the HMD and the controller. The object of interest estimation module 121 may obtain a plurality of collision coordinates 311, 321, 331 in a plurality of infinite planes by calculating coordinates at which the front vector (for example, a z-axis) collides in a plurality of infinite planes extending from a plurality of finite planes 313, 323, 333. The object of interest estimation module 121 may select, as a collision plane, a finite plane having a minimum distance from the collision coordinates on the infinite planes extending from the finite planes by measuring distances to the plurality of collision coordinates 311, 321 and 331 among the plurality of finite planes 313, 323 and 333 and comparing the measured distances 315, 325 and 335. For example, since the distance between the back plane 323 and the collision coordinates 321 on the infinite plane extending from the back plane 323 is the minimum value, the back plane 323 may be selected as the collision plane.

According to various example embodiments, the object of interest estimation module 121 may calculate distance information, angle information 360 and projected distance information between coordinates based on a center of the selected collision plane (for example, a center of the back plane 323), the collision coordinates 311, 321 and 331, the position coordinates 340 of the HMD and the controller and center coordinates 350 of the object. The projected distance information may be, for example, a value obtained by multiplying a sine value or a cosine value based on the angle information 360 by a length of a line segment formed by the collision coordinates 321 and the position coordinates 340 of the HMD and the controller. The object of interest estimation module 121 may generate a plurality of feature vectors based on the calculated information. The plurality of feature vectors may be collected for a time greater than or equal to one frame.

Figure 4:
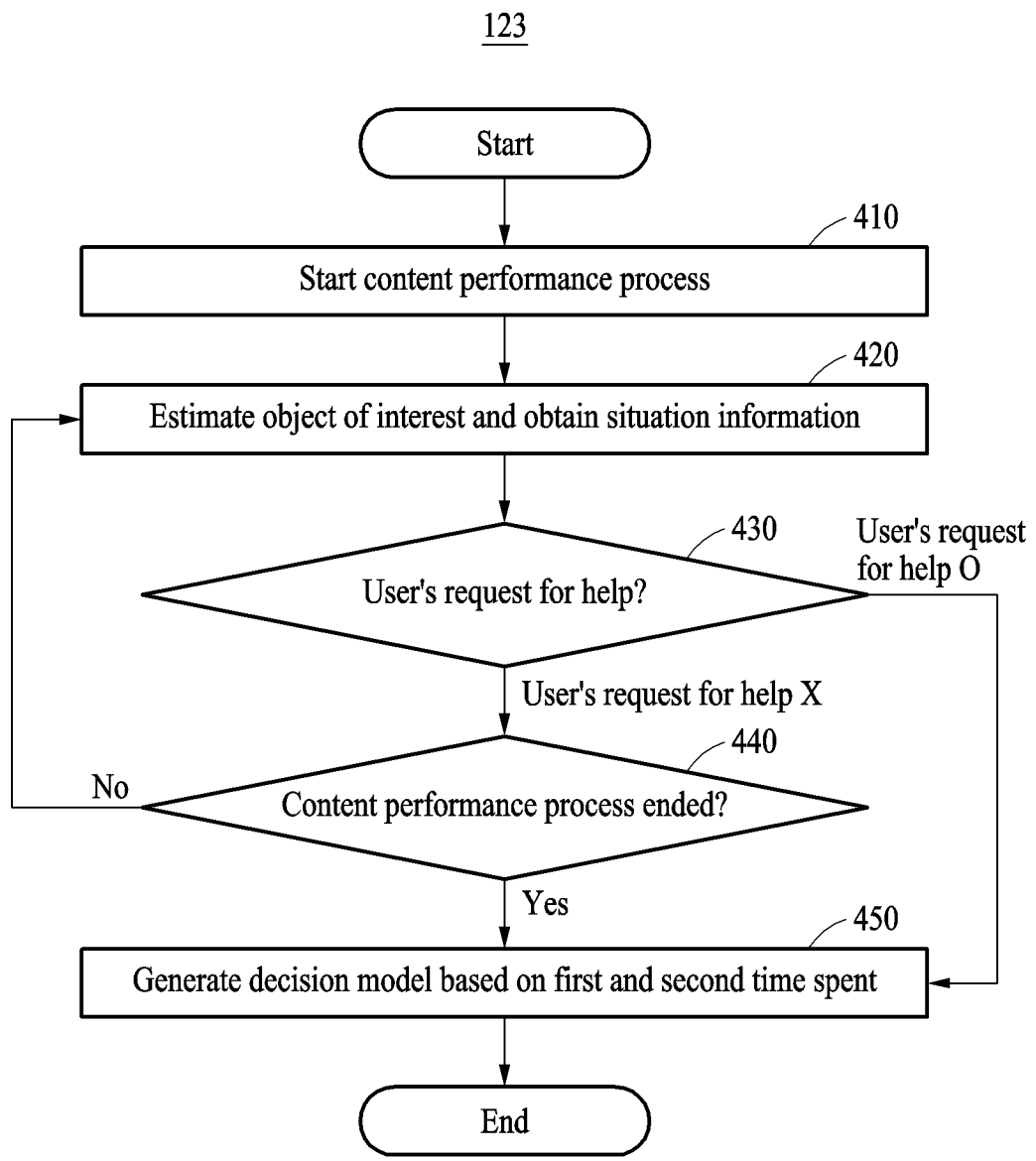
FIG. 4 is a flowchart illustrating an operation of generating a decision model according to various example embodiments.

FIG. 4 is a flowchart illustrating an operation of generating a decision model according to various example embodiments.

Operations 410 to 450 may be an operation of a support information generation determination module (for example, the support information generation determination module 123 of FIG. 1) generating the decision model 128 which determines whether to generate support information by determining the user's cognitive status.

In operation 410, the support information generation determination module 123 may request a user to perform a performance stage within content (e.g., the content 115 of FIG. 1), for example, espresso extraction training, terminology training, and the like. The performance stage may be additionally inserted into the content 115 to determine the user's cognitive status.

In operation 420, the support information generation determining module 123 may receive first feature data about the user's object of interest from an object of interest estimation module (for example, the object of interest estimation module 121 of FIG. 1) while the user performs the content 115, and receive second feature data about one or more objects from a situation information analysis module (for example, the situation information analysis module 122 of FIG. 2). The first feature data may include information (for example, a rate, a number, time, transition, etc. that the user looks at for a specific time) obtained (for example, measured) from one or more objects included in the content 115, and the second feature data may include information (for example, a rate, a number, time, transition, etc. that the user looks at) for each set obtained (for example, measured) from one or more objects classified into sets according to whether or not they are used.

In operation 430, the support information generation determination module 123 may store a time (for example, a first time spent) spent in a performance stage in which the user requests help or performs an operation corresponding thereto (for example, inputting a signal indicating a help request on the HMD or the controller) while the user performs the performance stage, and the first and the second feature data for the first time spent in a database (for example, the database 126 of FIG. 1).

In operation 440, the support information generation determination module 123 may store a time spent (for example, a second time spent) in the case that the user ends the performance in the performance stage in which the user does not request help, and the first and the second feature data for the second time spent. The support information generation determination module 123 may receive (for example, update) the first feature data from the object of interest estimating module 121 and receive (for example, update) the second feature data from the situation information analysis module 122 if the user fails to end the performance in the performance stage in which the user does not request help.

In operation 450, the support information generation determination module 123 may extract a key factor from the feature data by performing statistical analysis between the feature data (for example, the first and the second feature data) for the first time spent and the feature data for the second time spent, and store the key factor in the database 126. The support information generation decision module 123 may generate a decision model 128 that determines whether to generate support information based on the extracted key factor. For example, the key factor may be a number of and a time spent for transitions between the classified sets.

Figure 5:
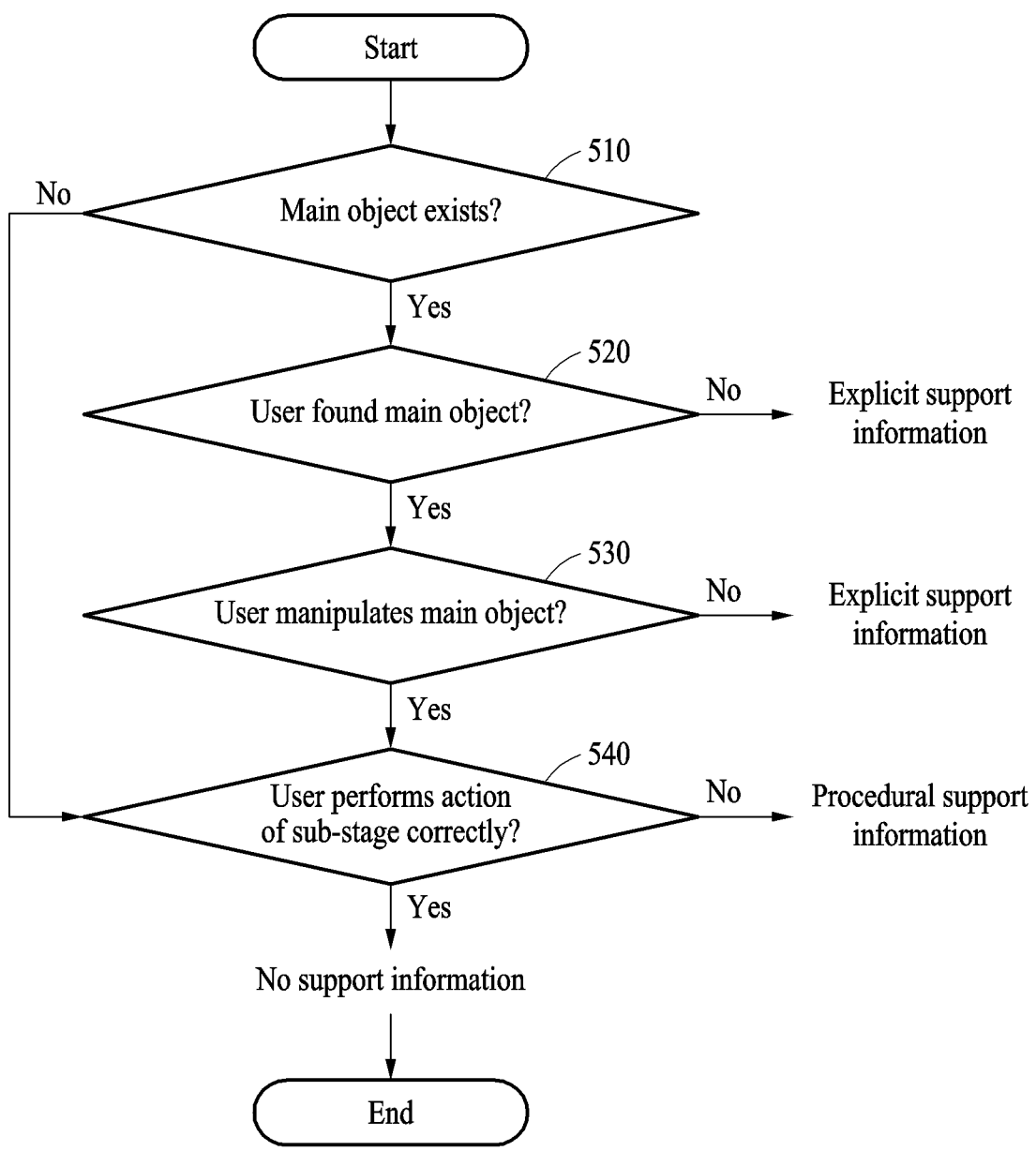
FIG. 5 is a flowchart illustrating a generation module according to various example embodiments.

FIG. 5 is a flowchart illustrating a generation module according to various example embodiments.

Operations 510 to 540 may be an operation of the generation module 124 receiving information about whether to generate support information from a decision model (for example, the support information generation determination module 123 of FIG. 1), and generating the support information by reflecting the progress of a sub-stage defined by a situation information analysis module (for example, the situation information analysis module 122) in the case that the support information generation determination module 123 decides to generate the support information.

In operation 510, the generation module 124 may check whether the user has found a main object if a main object exists in the sub-stage by receiving objects that the situation information analysis module 122 classified to one or more sets, and check whether the user has performed the action of the sub-stage correctly if the main object does not exist in the sub-stage. If the user performs the action of the sub-stage correctly, the generation module 124 may not generate the support information.

In operation 520, the generation module 124 may check whether the user manipulates the main object if the user finds the main object of the sub-stage, and generate explicit support information when the user does not find the main object. The explicit support information may include position clue information (for example, arrows, etc.) that may be used to find the main object.

In operation 530, the generation module 124 may check whether the user performs correctly the action of the sub-stage (for example, action to be performed using the main object defined by the situation information analysis module 122) by manipulating the main object if the user manipulates the main object, and generate the explicit support information if the user may not manipulate the main object. The explicit support information may include position clue information (for example, arrows, etc.) that may be used to find the main object.

In operation 540, the generation module 124 may not generate support information if the user correctly performs the action of the sub-stage by manipulating the main object, and generate procedural support information when the user does not perform the action correctly. The procedural support information may include information about a movement (for example, a video, etc.).

Figure 6:
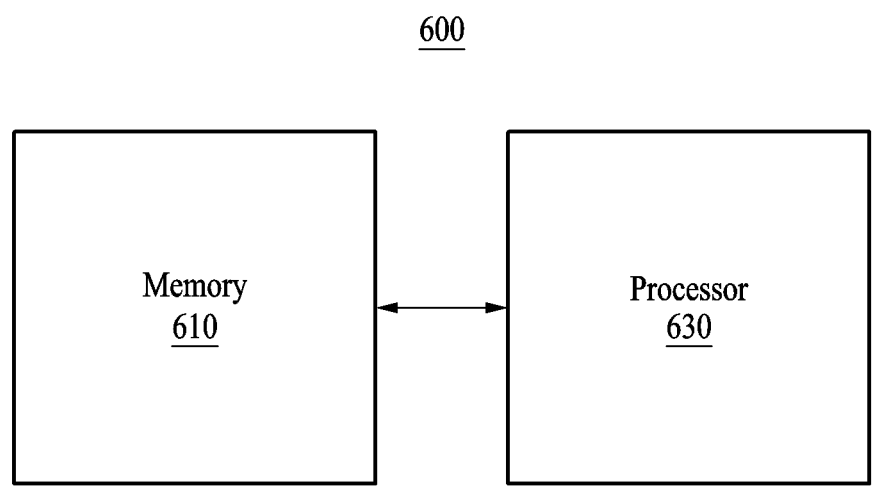
FIG. 6 illustrates another example of an electronic device according to various example embodiments.

FIG. 6 illustrates another example of an electronic device according to various example embodiments.

Referring to FIG. 6, according to various example embodiments, an electronic device 600 may be substantially the same as the electronic device 100 of FIG. 1.

A memory 610 may store instructions (for example, a program) executable by a processor 630. For example, the instructions may include instructions executing an operation of the processor 630 and/or an operation of each component of the processor 630.

The processor 630 may process data stored in the memory 610. The processor 630 may execute computer readable code (for example, software) stored in the memory 610 and instructions induced by the processor 630.

The processor 630 may be a data processing device implemented as hardware having a circuit of a physical structure for executing desired operations. For example, desired operations may include a code or instructions included in the program.

For example, a data processing device implemented as hardware may include a microprocessor, a central processing unit, a processor core, a multi-core processor, a multiprocessor, an application-specific integrated circuit (ASIC), and a field programmable gate array (FPGA).

The operation performed by the processor 630 may be substantially the same as the operation of the electronic device 100 described with reference to FIGS. 1 to 5. Each component (for example, the learning module 110 and the learning support module 120) of the electronic device 100 described with reference to FIGS. 1 to 3 may be executed by the processor 630. Accordingly, detailed description will be omitted.

The components described in the example embodiments may be implemented by hardware components including, for example, at least one digital signal processor (DSP), a processor, a controller, an ASIC, a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The example embodiments described herein may be implemented as a hardware component, a software component, and/or a combination thereof. For example, the apparatus, methods, and components described in the example embodiments may be implemented using a general purpose computer or special purpose computer, for example, a processor, a controller, an arithmetic logic unit (ALU), a digital signal processor, a microcomputer, an FPGA, a programmable logic unit (PLU), a microprocessor or any other device capable of executing and responding to an instruction. The processing device may execute an operating system (OS) and a software application running on the OS. Also, a processing device may access, store, manipulate, process and generate data in response to execution of the software. For convenience of understanding, although one processing device is sometimes described as being used, one of ordinary skill in the art may recognize that the processing device includes a plurality of processing elements and/or a plurality of types of processing elements. For example, the processing device may include a plurality of processors or one processor and one controller. Also, other processing configurations are possible, such as parallel processors.

Software may include computer programs, codes, instructions or combinations thereof, and configure or command independently or collectively a processing device to operate as desired. The software and/or data may be permanently or temporarily embodied in any kind of machine, component, physical device, virtual equipment, computer storage medium or apparatus, or transmitted signal wave to be interpreted by the processing device or to provide instructions or data to the processing device. The software may be distributed over networked computer systems and stored or executed in a distributed manner. Software and data may be stored in a computer readable recording medium.

The method according to the example embodiments may be implemented in the form of program instructions that may be executed through various computer means and recorded in a computer readable medium. The computer readable medium may store program instructions, data files, data structures, etc. alone or in combinations, and the program instructions recorded on the medium may be specially designed and configured for the example embodiment, or may be known and available to those skilled in the art of computer software. Examples of the computer readable recording medium include hardware devices configured specially to store and execute program instructions such as magnetic media such as a hard disk, a floppy disk, and a magnetic tape, optical media such as a compact disk read only memory (CD-ROM), and a digital video disk (DVD), and magneto-optical media such as a floptical disk, a read only memory (ROM), a random access memory (RAM), and a flash memory. Examples of program instructions include not only machine language codes such as those generated by a compiler, but also high level language codes that can be executed by a computer using an interpreter etc.

The hardware devices herein may be configured to operate as one or a plurality of software modules to perform the operations of the example embodiments, and vice versa.

As described above, although the example embodiments have been described with reference to the limited drawings, one of ordinary skill in the art may apply various technical modifications and variations based thereon. For example, the described techniques performed in an order different from the described method, and/or the described components of the system, structure, apparatus, circuit, etc. combined in a different form than the described method, or replaced or substituted by other components or equivalents may achieve an appropriate result.

Therefore, other implementations, other example embodiments, and equivalents to the claims are also within the scope of the following claims.

What is claimed is:

1. A method of supporting self-learning, the method comprising:
    estimating an object of interest of a user in content based on user performance information inputted by the user in response to content situation information and the content being received from a learning module comprising the content;
    analyzing the content situation information;
    determining whether to generate support information for supporting the user to perform the content based on the estimated object of interest and the analyzed content situation information; and
    generating the support information that allows the user to self-learn the content according to whether to generate the support information, and outputting the support information to the learning module,
    wherein the user performance information includes position information and rotation information of a head-mounted display (HMD) worn by the user and a controller while performing the content and information input to the controller, and
    wherein the content situation information includes one or more of information about all performance stages included in the content, information about a performance stage currently being performed by the user, information about a time taken to perform the content, and information about properties of one or more objects included in the content.

2. The method of claim 1, further comprising:
    generating an evaluation for the support information based on a response of the user according to the support information and updating the support information based on the evaluation; and
    storing the evaluation and the updated support information in a database.

3. The method of claim 1, wherein the user performance information is received by the learning module from the HMD that does not have an eye tracking function and the controller.

4. The method of claim 3, wherein the estimating comprises:
    selecting, as a collision plane, one of a plurality of finite planes forming the one or more objects comprised in the content from the position information and the rotation information of the HMD and the controller, and position information, rotation information and size information of the one or more objects;

generating a plurality of feature vectors based on center coordinates of the collision plane, a plurality of collision coordinates, positions of the HMD and the controller and center coordinates of the object;

generating an estimation model based on the plurality of feature vectors; and estimating the object of interest using the estimation model.

5. The method of claim 1, wherein the selecting comprises:

extracting front vectors of the HMD and the controller;

obtaining a plurality of collision coordinates on a plurality of infinite planes by calculating coordinates at which the front vectors collide on the plurality of infinite planes, the plurality of infinite planes extending from a plurality of finite planes forming an object comprised in the content; and selecting, as a collision plane, a finite plane having a minimum distance from the plurality of collision coordinates from among the plurality of finite planes.

6. The method of claim 1, wherein the analyzing comprises dividing one of one or more performance stages comprised in the content into a plurality of sub-stages; and defining a main object among the one or more objects for each of the plurality of sub-stages and defining an action to be performed by the user using the main object.

7. The method of claim 6, wherein the determining of whether to generate the support information comprises:

generating a decision model based on feature data for a first time spent in the performance stage for which the user requests help and feature data for a second time spent in the performance stage for which the user does not request help; and determining whether to generate the support information using the decision model.

8. The method of claim 6, wherein the support information comprises:

position clue information to find the main object; and motion information about an action required for the user to perform the content.

9. A device comprising:

a memory comprising instructions; and a processor electrically connected to the memory and configured to execute the instructions;

wherein when the instructions are executed by the processor, the processor is configured to:

estimate an object of interest of a user in content based on user performance information inputted by the user in response to content situation information and the content being received from a learning module comprising the content;

analyze the content situation information;

determine whether to generate support information for supporting the user to perform the content based on the estimated object of interest and the analyzed content situation information; and generate the support information that allows the user to self-learn the content according to whether to generate the support information, and output the support information to the learning module, wherein the user performance information includes position information and rotation information of a head-mounted display (HMD) worn by the user and a controller while performing the content and information input to the controller, and wherein the content situation information includes one or more of information about all performance stages included in the content, information about a performance stage currently being performed by the user, information about a time taken to perform the content, and information about properties of one or more objects included in the content.

10. The device of claim 9, wherein the processor is configured to:

generate an evaluation of the support information based on a response of the user according to the support information and update the support information based on the evaluation; and store the evaluation and the updated support information in a database.

11. The device of claim 9, wherein the user performance information is received by the learning module from the HMD that does not have an eye tracking function and the controller.

12. The device of claim 11, wherein the processor is configured to:

select, as a collision plane, one of a plurality of finite planes forming the one or more objects comprised in the content from the position information and the rotation information of the HMD and the controller, and position information, rotation information and size information of the one or more objects;

generate a plurality of feature vectors based on center coordinates of the collision plane, a plurality of collision coordinates, positions of the HMD and the controller and center coordinates of the object;

generate an estimation model based on the plurality of feature vectors; and estimate the object of interest using the estimation model.

13. The device of claim 9, wherein the processor is configured to:

extract front vectors of the HMD and the controller;

obtain a plurality of collision coordinates on a plurality of infinite planes by calculating coordinates at which the front vectors collide on the plurality of infinite planes, the plurality of infinite planes extending from a plurality of finite planes forming an object comprised in the content; and select, as a collision plane, a finite plane having a minimum distance from the plurality of collision coordinates from among the plurality of finite planes.

14. The device of claim 9, wherein the processor is configured to:

divide one of one or more performance stages comprised in the content into a plurality of sub-stages; and define a main object among the one or more objects for each of the plurality of sub-stages and define an action to be performed by the user using the main object.

15. The device of claim 14, wherein the processor is configured to:

generate a decision model based on feature data for a first time spent in the performance stage for which the user requests help and feature data for a second time spent in the performance stage for which the user does not request help; and determine whether to generate the support information using the decision model.

16. The device of claim 14, wherein the support information comprises:

position clue information to find the main object; and motion information about an action required for the user to perform the content.

\* \* \* \* \*